United States Patent Office 3,384,635
Patented May 21, 1968

3,384,635
1,4-BENZODIAZEPINE DERIVATIVES
Philip M. Carabateas, Schodack, N.Y., assignor to Sterling Drug Inc., New York, N.Y., a corporation of Delaware
No Drawing. Continuation-in-part of application Ser. No. 465,198, June 18, 1965. This application Sept. 28, 1966, Ser. No. 582,529
14 Claims. (Cl. 260—239)

ABSTRACT OF THE DISCLOSURE $1-R_1-3-R_3-4-R_4$-1H-2,3,4,5 - tetrahydro - 1,4 - benzodiazepines, where $R_1$ is hydrogen, lower-alkanoyl, lower-alkanesulfonyl, or benzoyl, $R_3$ is hydrogen or lower-alkyl, and $R_4$ is lower-alkenyl, halo-(lower-alkenyl), phenyl-(lower-alkyl), lower-cycloalkyl-(lower-alkyl) or lower-carbalkoxy-(lower-alkyl), analgesic antagonists, are prepared by reducing the corresponding $3-R_3-4-R_4$-3H-1,4-benzodiazepine-2,5(1H,4H)-diones to prepare said compounds where $R_1$ is hydrogen and acylating the latter to obtain said compounds where $R_1$ is lower-alkanoyl, lower-alkanesulfonyl or benzoyl. Intermediate 4-(cycloalkylalkyl)-3H-1,4-benzodiazepine-2,5(1H,4H)-diones also have psychomotor depressant activity.

---

This invention relates to compositions of matter of the class of 1,4-benzodiazepines.

This application is a continuation-in-part of my copending application Ser. No. 465,198, filed June 18, 1965, and now abandoned, which in turn is a continuation-in-part of its copending application Ser. No. 312,303, filed Sept. 30, 1963 and now abandoned.

The invention sought to be patented, in one composition aspect, resides in the class of compounds which I depict as having a molecular structure in which a 1H-2,3,4,5-tetrahydro-1,4-benzodiazepine is unsubstituted or substituted at the 1-position by lower-alkanoyl, lower-alkanesulfonyl or benzoyl, unsubstituted or substituted at the 3-position by lower-alkyl, and substituted at the 4-position by lower-alkenyl, halo-(lower-alkenyl), phenyl-lower-alkyl), (lower-cycloalkyl)-(lower-alkyl) or lower-carbalkoxy-(lower-alkyl).

Among the compounds of my invention are those of Formula I

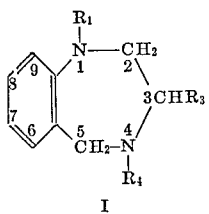

where $R_1$ is hydrogen, lower alkanoyl, lower-alkanesulfonyl, or benzoyl, $R_3$ is hydrogen or lower-alkyl, and $R_4$ is lower-alkenyl, halo-(lower-alkenyl), phenyl-(lower-alkyl), lower-cycloalkyl-(lower-alkyl) or lower-carbalkoxy-(lower-alkyl). The benzenoid ring of Formula I can be substituted by low-molecular weight substituents, e.g., halo, lower-alkyl, lower-alkyl, lower-alkoxy, lower alkylmercapto, lower-alkanoylamino, lower-alkylamino, nitro, amino, hydroxy, lower-alkanoyloxy, benzyloxy, and the like, at any of the available positions, i.e., 6, 7, 8, or 9, and where more than one substitutent is present, they can be the same or different and they can be in any of the various position combinations relative to each other. Such additions to the molecular structure of the inventive concept herein described are, therefore, equivalents of the subject matter sought to be patented. The halo substituents include chloro, bromo, iodo and fluoro.

The compounds of Formula I have pharmacodynamic properties, e.g., they are useful as antagonists of strong analgesic agents, e.g., meperidine.

The term "lower-alkyl," as used herein, e.g., as one of the meanings for $R_3$ in Formula I or for R below, means alkyl radicals having from one to six carbon atoms and is illustrated by methyl, ethyl, n-propyl, isopropyl, n-butyl, 2-butyl, isobutyl, n-amyl, isoamyl, n-hexyl, 3-hexyl, and the like.

The term "lower-alkenyl," as used herein, e.g., as one of the meanings for $R_4$ in Formula I, means alkenyl radicals having from three to six carbon atoms and is illustrated by 2-propenyl (allyl), 2-methyl-2-propenyl, 3-methyl-2-butenyl, 3-butenyl, 2-hexenyl, and the like.

The term "halo-(lower-alkenyl)," as used herein, e.g., as one of the meanings for $R_4$ in Formula I, means haloalkenyl radicals having from three to six carbon atoms and from one to two halo substituents (i.e., chloro, bromo, iodo and fluoro, preferably chloro and bromo), and is illustrated by —CH$_2$CH=CHCl, —CH(CH$_3$)CH=CHCl —CH$_2$CH=CHBr, —CH$_2$CH=CHI, —CH$_2$CH=CHF,

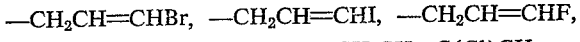

—CH$_2$CH$_2$CH$_2$CH=C(Cl)(CH$_3$), and the like.

The term "lower-carbalkoxy," as used herein, can be represented structurally as —COOR, where R is lower-alkyl as defined above.

The term "lower-alkanoyl," as used herein, e.g., as one of the meanings for $R_1$ in Formula I, means alkanoyl radicals having from one to six carbon atoms, illustrated by formyl, ethanoyl (acetyl), n-propanoyl (propionyl), n-butanoyl (butyryl), 2-methyl-n-butanoyl, n-hexanoyl, and the like.

The term "lower-alkanesulfonyl," as used herein, e.g., as one of the meanings for $R_1$ in Formula I, means alkanesulfonyl radicals having from one to six carbon atoms, illustrated by methanesulfonyl, ethanesulfonyl, n-propanesulfonyl, 2-propanesulfonyl, n-butanesulfonyl, 2-butanesulfonyl, n-hexanesulfonyl, and the like.

The term "lower-cycloalkyl," as used in the term "(lower-cycloalkyl)-(lower-alkyl)," one of the meanings for $R_4$ in Formula I, means cycloalkyl radicals having from three to six carbon atoms, illustrated by cyclopropyl, cyclobutyl, cyclopentyl and cyclohexyl.

The compounds of Formula I are prepared by the procedure presented structurally as follows:

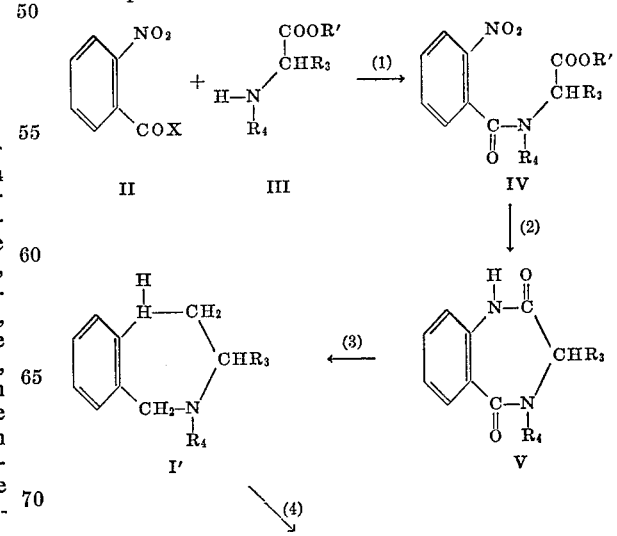

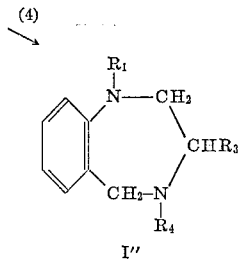

where $R_3$ and $R_4$ have the meanings designated above for Formula I, R' is hydrogen or lower-alkyl, X is halogen and $R_1$ (in Formula I'') is lower-alkanoyl, lower-alkanesulfonyl or benzoyl. Thus, in Step 1, a 2-nitrobenzoyl halide (II), preferably the chloride, is reacted with a glycine or its lower-alkyl ester (III) to yield an N—$R_4$—N—($CHR_3COOR'$)-2-nitrobenzamide (IV), which in Step 2 is cyclized to form the 3H-1,4-benzodiazepine-2,5(1H,-4H)-dione (V). In Step 3 the dione is reduced to produce the 1H-2,3,4,5-tetrahydro-1,4-benzodiazepine (I') which is acylated to yield the corresponding 1-acyl derivative (I''). Each of Steps 1, 2, 3 and 4 are illustrated by specific examples hereinbelow. Compounds of Formulas I' and I'' having —$NH_2$ or —OH substituents in the benzenoid ring are prepared by converting by conventional means the corresponding compounds of Formula I' bearing, respectively, —NH-acetyl or —$OCH_3$ substituents into the corresponding —$NH_2$ or —OH compounds, and then selectively acylating (Step 4) with one molar equivalent quantity of acylating agent to form the compounds of Formula I'' having the —$NH_2$ or —OH substituents.

Alternatively, other procedures can be used to prepare the compounds of Formula I (or I' or I''). For example, reaction of the compounds of Formula I' where $R_4$ is hydrogen with a lower-alkyl acrylate, e.g., methyl acrylate, yields the corresponding 4-(lower-carbalkoxy)ethyl compound which can be acylated in Step 4 to form the corresponding compounds of Formula I''.

Another process of preparing the intermediate 3H-1,4-benzodiazepine-2,5(1H,4H)-diones (Formula V above) comprises reacting an isatoic anhydride, i.e., an N-carboxyanthranilic acid anhydride, (Formula VI below) with a lower-alkyl N—$R_4$-glycinate or the corresponding acid (Formula III' below), as illustrated structurally as follows:

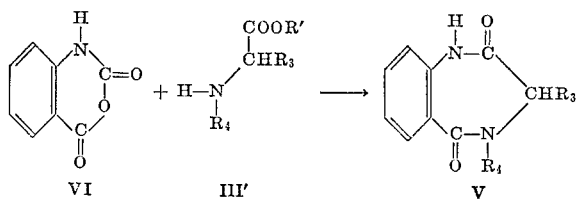

where R' and $R_3$ are each hydrogen or lower-alkyl and $R_4$ has the meaning given above for Formula I; also, the benzenoid ring (of VI and V) can be substituted as noted hereinabove. The reaction is carried out by heating the reactants from about 75° C. to about 185° C., preferably from 140° C. to 160° C. The reaction is carried out in the absence of any solvent or in the presence of an organic solvent which is inert under the conditions of the reaction, e.g., dimethylformamide, chlorobenzene. The acid (III', R=H) or ester (III', R=lower-alkyl) can be used and the latter can be used in its free base form or as its acid-addition salt, e.g., hydrochloride.

The compounds of Formula I, I' and I'' are useful both in free base form and in acid-addition salt form and both forms are within the purview of the invention, and, in fact, are considered to be one and the same invention. The acid-addition salts are simply a usually more convenient form for use; and, in practice, use of the salt form inherently amounts to use of the base form. The acids which can be used to prepare the acid-addition salts are preferably those which produce, when combined with the free base, pharmacodynamically acceptable salts, that is, salts whose anions are relatively innocuous to the animal organism in pharmacodynamic doses of the salts, so that the beneficial properties inherent in the free base are not vitiated by side effects ascribable to the anions; in other words, the latter do not substantially affect the pharmacodynamic properties inherent in the cations. In practicing my invention, I found it convenient to employ the hydrochloride salt. However, other appropriate pharmacodynamically acceptable salts within the scope of the invention are those derived from mineral acids such as hydrobromic acid, nitric acid, phosphoric acid, sulfamic acid, and sulfuric acid, and organic acids such as acetic acid, citric acid, ethanesulfonic acid, quinic acid, and the like, giving the hydrobromide, hydriodide, nitrate, phosphate, sulfamate, sulfate, acetate, citrate, tartrate, lactate, methanesulfonate, ethanesulfonate and quinate, respectively.

The acid-addition salts are prepared preferably by reacting the free base and acid in an organic solvent, e.g., ethanol, in which case the salt separates directly or can be obtained by concentration of the solution.

Although pharmacodynamically acceptable salts are preferred, all acid-addition salts are within the scope of my invention. All acid-addition salts are useful as sources of the free base form even if the particular salt per se is not desired as the final product, as for example when the salt is formed for purposes of purification or identification, or when it is used as an intermediate in preparing a pharmacodynamically acceptable salt by ion exchange procedures.

Another aspect of my invention resides in the concept of a composition having a molecular structure in which a 3H-1,4-benzodiazepine2,5(1H,4H)-dione is substituted at the 4-position by (lower-cycloalkyl)-(lower-alkyl) and is either unsubstituted or substituted at the 3-position by lower-alkyl represented by Formula V where $R_3$ is hydrogen or lower-alkyl and $R_4$ is lower-cycloalkyl-(lower-alkyl). Further, the benzenoid nucleus can be substituted as indicated above for the compounds of Formula I. These compounds, in addition to being useful as intermediates, have been tested in mice and found to have psychomotor depressant activity.

The molecular structures of the compounds of my invention are established by their mode of synthesis and corroborated by the correspondence of calculated and found values for the elementary analyses and by infrared (IR) spectral analyses.

The following examples will further illustrate the invention without, however, limiting it thereto.

EXAMPLE 1

The intermediate N-(2-nitrobenzoyl)glycine derivatives (Formula IV) were prepared by the following illustrated procedure.

(A) Ethyl N-allyl-N-(2-nitrobenzoyl)glycinate.—A solution containing 63.5 g. of ethyl N-allylglycinate and 45 g. of triethylamine dissolved in 600 ml. of ethylene dichloride was cooled to 5–10° C. and to the cooled solution was added dropwise over a period of about forty-five minutes a solution containing 82.6 g. of 2-nitrobenzoyl chloride in 100 ml. of ethylene dichloride, keeping the temperature of the reaction mixture below 10° C. during the addition. The reaction mixture was washed several times with water to remove the triethylamine hydrochloride formed during the reaction and then to remove the ethylene dichloride. The remaining oily material was dried by azeotropic distillation with benzene; and the dried oil was distilled in vacuo to yield 121.1 g. (93% yield) of ethyl N-allyl-N-(2-nitrobenzoyl)glycinate, B.P. 170–174° C. at 0.2 mm.

Following the above procedure but using ethyl N-(cyclopropylmethyl)glycinate, ethyl N-allylalaninate or ethyl N-phenethylglycinate, in place of ethyl N-allylglycinate the following compounds were obtained: ethyl N-(cyclopropylmethyl) - N - (2 - nitrobenzoyl)glycinate (78.3% yield), B.P. 155–165° C./0.07 mm.; ethyl N-allyl-N-(2-nitrobenzoyl)alaninate (98.5% crude yield); or, ethyl N-(phenethyl)glycinate (96.5% crude yield). The last two named compounds were used directly in the next Step 2 without further purification. Following the above procedure but using 4-methoxy-2-nitrobenzoyl chloride in place of 2-nitrobenzoyl chloride, there was obtained ethyl N - allyl-N-(4-methoxy-2-nitrobenzoyl)glycinate (70.3% yield), B.P. 180–185° C./0.1 mm.

Ethyl N-(cyclopropylmethyl)glycinate was prepared as follows: To a solution of 77.4 g. of cyclopropylmethylamine cooled to 5° C. was added with stirring over a period of three hours 83.5 g. of ethyl bromoacetate, keeping the reaction mixture between 5–10° C. during the addition. The reaction mixture was then allowed to stand for two days in a refrigerator. The solid was filtered off and washed with ether. The filtrate and washings were combined and heated in vacuo to remove the ether. Vacuum distillation of the remaining oil yielded 57.7 g. (73.7%) of ethyl N-(cyclopropylmethyl)glycinate, B.P. 57–60° C./1.1 mm.

Following the procedure described above for the preparation of ethyl N-allyl-N-(2-nitrobenzoyl)glycinate and using corresponding molar equivalent quantities of the appropriate Q'-2-nitrobenzoyl chloride and ethyl N-R$_4$-α-R$_3$-glycinate hydrochloride, the compounds of Table A can be prepared.

removed and a solution of ethyl N-allyl-N-(2-nitrobenzoyl)glycinate (90.5 g., 0.31 mole) in 200 ml. of ethanol was added at a rate causing steady reflux. After the addition had been completed, the mixture was refluxed with stirring for three hours. Sodium carbonate (40 g.) was added cautiously, the mixture was stirred for five minutes and then filtered hot. The filter cake was washed with 1.5 liters of hot ethanol and the combined filtrate and washings evaporated in vacuo to a tan solid. This was washed with water and recrystallized from ethanol using decolorizing charcoal. There was obtained 63 g. (94%) of product, 4-allyl-3H-1,4-benzodiazepine-2,5(1H,4H)-dione, M.P. 184.8–182.2° C.

(B) From isatoic anhydride and ethyl N-allylglycinate.—Isatoic anhydride (16.3 g.) and 14.3 g. of ethyl N-allyl-glycinate were combined and heated on the steam bath for two hours. Ethanol was added, the solution was chilled and scratched and the resulting solid collected. One recrystallization from ethanol gave 8.0 g. (36%) of 4-allyl-3H-1,4-benzodiazepine-2,5(1H,4H) - dione, M.P. 185–186° C., undepressed on mixture with material from Method 2A.

Following the procedure described in Example 2B and using corresponding molar equivalent quantities of the appropriate Q'-isatoic anhydride and lower-alkyl N-R$_4$-α-R$_3$-glycinate, the compounds of Table B can be prepared.

TABLE A

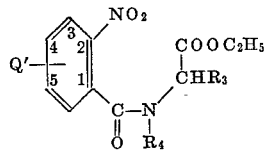

| Example | Q' | R$_3$ | R$_4$ |
|---|---|---|---|
| 1B | 4-C$_2$H$_5$ | C$_2$H$_5$ | —CH$_2$—cyclopropyl |
| 1C | 4,6-(CH$_3$)$_2$ | H | —CH$_2$CH=CH$_2$ |
| 1D | 4-OCH$_3$ | CH$_3$ | —CH$_2$—cyclopropyl |
| 1E | 5-OC$_4$H$_9$-n | H | —CH$_2$—phenyl |
| 1F | 4-SCH$_3$ | C$_4$H$_9$-n | —(CH$_2$)$_3$—phenyl |
| 1G | 4-S—CH$_3$ ↓ O | H | —CH$_2$—cyclopropyl |
| 1H | 4-S—CH$_3$ ↓↑ O O | H | —(CH$_2$)$_2$—cyclohexyl |
| 1I | 5-NHCOCH$_3$ | H | —CH$_2$C(CH$_3$)=CH$_2$ |
| 1J | 4-NHCOC$_2$H$_5$ | H | —CH$_2$CH$_2$CH=CH$_2$ |
| 1K | 4-NHC$_4$H$_9$-n | H | —CH$_2$CH=CHCl |
| 1L | 4-NHC$_6$H$_{13}$-n | CH$_3$ | —CH$_2$CH=CHBr |
| 1M | 4-N(C$_2$H$_5$)$_2$ | H | —CH$_2$CH=C(Cl)$_2$ |
| 1N | 3,4-Cl$_2$ | H | —(CH$_2$)$_4$COOC$_2$H$_5$ |
| 1O | 4-Br | H | —CH$_2$—cyclobutyl |
| 1P | 5-I | H | —CH$_2$CH=CH(CH$_2$)$_2$CH$_3$ |
| 1Q | 4-CF$_3$ | H | —CH$_2$CH=CH$_2$ |
| 1R | 6-CH$_3$ | H | —CH$_2$CH=CH$_2$ |
| 1S | H | H | —CH$_2$—cyclohexyl |
| 1T | 5-OCH$_3$ | H | —CH$_2$CH=CH$_2$ |
| 1U | 5-NHCOCH$_3$ | H | —CH$_2$CH=CH$_2$ |

TABLE B

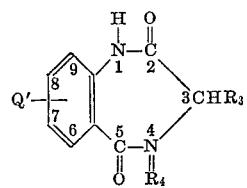

| Example | Q' | R$_3$ | R$_4$ |
|---|---|---|---|
| 2C | 8-C$_2$H$_5$ | C$_2$H$_5$ | —CH$_2$—cyclopropyl |
| 2D | 6,8-(CH$_3$)$_2$ | H | —CH$_2$CH=CH$_2$ |
| 2E | 8-OCH$_3$ | CH$_3$ | —CN$_2$—cyclopropyl |
| 2F | 7-OC$_4$H$_9$-n | H | —CH$_2$—phenyl |
| 2G | 8-SCH$_3$ | C$_4$H$_9$-n | —(CH$_2$)$_3$—phenyl |
| 2H | 8-S—CH$_3$ ↓ O | H | —CH$_2$—cyclopropyl |
| 2I | 8-S—CH$_3$ ↓↑ O O | H | —(CH$_2$)$_2$—cyclohexyl |
| 2J | 7-NHCOCH$_3$ | H | —CH$_2$C(CH$_3$)=CH$_2$ |
| 2K | 8-NHCOC$_2$H$_5$ | H | —CH$_2$CH$_2$CH=CH$_2$ |
| 2L | 8-NHC$_4$H$_9$-n | H | —CH$_2$CH=CHCl |
| 2M | 8-NHC$_6$H$_{13}$-n | CH$_3$ | —CH$_2$CH=CHBr |
| 2N | 8-n(C$_2$H$_5$)$_2$ | H | —CH$_2$CH=C(Cl)$_2$ |
| 2O | 8,9-Cl$_2$ | H | —(CH$_2$)$_4$COOC$_2$H$_5$ |
| 2P | 8-Br | H | —CH$_2$—cyclobutyl |
| 2Q | 7-I | H | —CH$_2$CH=CH(CH$_2$)$_2$CH$_3$ |
| 2R | 8-CF$_3$ | H | —CH$_2$CH=CH$_2$ |
| 2S | 6-CH$_3$ | H | —CH$_2$CH=CH$_2$ |
| 2T | H | H | —CH$_2$—cyclohexyl |
| 2U | 7-OCH$_3$ | H | —CH$_2$CH=CH$_2$ |
| 2V | 7-NHCOCH$_3$ | H | —CH$_2$CH=CH$_2$ |

The starting materials (Q'-2-nitrobenzoyl chloride and ethyl N-R$_4$-α-R$_3$-glycinate) for the preparation of the compounds of Table A are generally known and are prepared by conventional methods.

EXAMPLE 2

4-allyl-3H-1,4-benzodiazepine - 2,5(1H,4H)-dione was prepared by the two following methods.

(A) From ethyl N-allyl - N - (2-nitrobenzoyl)glycinate.—A vigorously stirred mixture of 117 g. of iron filings, 750 ml. of ethanol, 30 ml. of acetic acid and 210 ml. of water was heated to reflux. The heating source was The starting materials for the preparation of the compounds of Table B are generally known and are prepared by conventional methods.

EXAMPLE 3

4-allyl-3-methyl - 3H-1,4 - benzodiazepine-2,5(1H,4H)-dione was prepared following the procedure in Example 2A using 111.6 g. of iron filings, 700 ml. of ethanol, 35 ml. of acetic acid, 210 ml. of water, and 101.5 g. of ethyl N-allyl-N-(2-nitrobenzoyl)alaninate in 200 ml. of ethanol. There was obtained 48.8 g. (64%) of 4-allyl-3-methyl-3H-1,4-benzodiazepine-2,5(1H,4H) - dione, M.P.

137.4–139.2° C. (corr.), after successive recrystallizations from methanol and ethanol.

EXAMPLE 4

4-phenethyl-3H-1,4-benzodiazepine-2,5(1H,4H)-dione was prepared following the procedure in Example 2A using acid, 200 ml. of water, and 50.5 g. of ethyl N-phenethyl-N-(2-nitrobenzoyl)glycinate in 100 ml. of ethanol. There was obtained 14.0 g. (36%) of 4-phenethyl-3H-1,4-benzodiazepine-2,5(1H,4H)-dione, M.P. 188.0–189.2° C. (corr.), when recrystallized from isopropyl alcohol.

EXAMPLE 5

4-allyl-7-chloro-3H-1,4-benzodiazepine-2,5(1H,4H)-dione was prepared as follows: Ethyl N-allylglycinate (14.3 g.) was added to 18.4 g. of 5-chloroisatoic anhydride in a 250 ml. round-bottom flask. The flask was heated on the steam bath for 0.5 hour. The reaction mixture foamed vigorously while evolving carbon dioxide and eventually became a clear brown liquid. This was heated to 160–180° C. for 2.5 hours, while more gas was evolved. After standing for two days, the thick oil was dissolved in 100 ml. of boiling ethanol. The solution was chilled and scratched and the resulting crystals collected. After recrystallization from ethanol, 3.5 g. (12.3%) of 4-allyl-7-chloro-3H-1,4-benzodiazepine-2,5(1H,4H)-dione, M.P. 189.0–191.0° C. (corr.), was obtained.

EXAMPLE 6

4-allyl-7-nitro-3H-1,4-benzodiazepine-2,5(1H,4H)-dione was prepared as follows: A mixture of 14.3 g. of ethyl N-allylglycinate and 20.8 g. of 5-nitroisatoic anhydride was heated first for two hours on a steam bath and then for three hours at 170–175° C. The reaction mixture was then cooled and allowed to stand overnight; it was then dissolved in boiling ethanol, the solution treated with decolorizing charcoal and filtered, and the filtrate concentrated to a volume of about 150 ml. and allowed to stand. The yellow crystalline precipitate was collected and recrystallized from ethanol to yield 7.0 g. of the 4-allyl-7-nitro-3H-1,4-benzodiazepine-2,5(1H,4H)-dione, M.P. 188.4–191.6° C. (corr.).

EXAMPLE 7

4-allyl-1H-2,3,4,5-tetrahydro-1,4-benzodiazepine was prepared as follows: 4-allyl-3H-1,4-benzodiazepine-2,5-(1H,4H)-dione (63 g.) was added in portions to a stirred suspension of 33.2 g. of lithium aluminum hydride in 1000 ml. of tetrahydrofuran at a rate causing reflux. The resulting mixture was refluxed with stirring for seven hours and then allowed to stand for about sixteen hours. The excess lithium aluminum hydride was decomposed by cautious addition of 35 ml. of water, followed by addition of 135 ml. of a saturated sodium potassium tartrate solution. Stirring was continued for one hour more, the white granular precipitate filtered off, and the filter cake washed well with about one liter of tetrahydrofuran. The filtrate and washings were concentrated in vacuo to yield an oily product which was dried azeotropically by heating with benzene and was then distilled in vacuo to yield 44 g. of 4-allyl-1H-2,3,4,5-tetrahydro-1,4-benzodiazepine in free base form, B.P. 84–85° C./0.13 mm.; its dihydrochloride, recrystallized from methanol, melted at 189.8–199.8° C. (dec.) (corr.).

Following the procedure described in Example 7 and using corresponding molar equivalent quantities of the appropriate Q'-3-R₃-4-R₄-3H-1,4 - benzodiazepine - 2,5 (1H,4H)-dione, the Q'-3-R₃-4-R₄-1H-2,3,4,5-tetrahydro-1,4-benzodiazepines of Table C can be prepared.

TABLE C

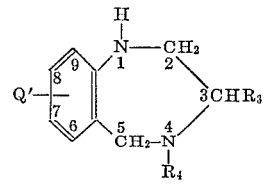

| Example | Q' | R₃ | R₄ |
| --- | --- | --- | --- |
| 7A | 8-C₂H₅ | C₂H₅ | —CH₂—cyclopropyl |
| 7B | 6,7-(CH₃)₂ | H | —CH₂CH=CH₂ |
| 7C | 8-OCH₃ | CH₃ | —CH₂—cyclopropyl |
| 7D | 7-OC₄H₉-n | H | —CH₂—phenyl |
| 7E | 8-SCH₃ | C₄H₉-n | —(CH₂)₃—phenyl |
| 7F | 8-S—CH₃ ↓ O | H | —CH₂—cyclopropyl |
| 7G | 8-S—CH₃ (O↑, ↓O) | H | —(CH₂)₂—cyclohexyl |
| 7H | 7-NHCOCH₃ | H | —CH₂C(CH₃)=CH₂ |
| 7I | 8-NHCOC₂H₅ | H | —CH₂CH₂CH=CH₂ |
| 7J | 8-NHC₄H₉-n | H | —CH₂CH=CHCl |
| 7K | 8-NHC₆H₁₃-n | CH₃ | —CH₂CH=CHBr |
| 7L | 8-N(C₂H₅)₂ | H | —CH₂CH=C(Cl)₂ |
| 7M | 8,9-Cl₂ | H | —(CH₂)₄COOC₂H₅ |
| 7N | 9-Br | H | —CH₂—cyclobutyl |
| 7O | 7-I | H | —CH₂CH=CH(CH₂)₂CH₃ |
| 7P | 8-CF₃ | H | —CH₂CH=CH₂ |
| 7Q | 6-CH₃ | H | —CH₂CH=CH₂ |
| 7R | H | H | —CH₂—cyclohexyl |
| 7S | 7-OCH₃ | H | —CH₂CH=CH₂ |
| 7T | 7-NHCOCH₃ | H | —CH₂CH=CH₂ |

The 1-(lower-alkanoyl) derivatives of the compounds of Table C can be prepared following the procedure illustrated hereinbelow in Examples 11–18, e.g., the 1-propionyl derivatives are prepared following the procedure of Example 11 using propionyl chloride and the approriate 3-R₃-4-R₄-1H-2,3,4,5-tetrahydro-1,4-benzodiazepine of Table C.

EXAMPLE 8

4-phenethyl-1H-2,3,4,5-tetrahydro-1,4 - benzodiazepine was prepared following the procedure described in Example 7 using 8.0 g. of 4-phenethyl-3H-1,4-benzodiazepine-2,5-(1H,4H)-dione, 3.2 g. of lithium aluminum hydride, 100 ml. of tetrahydrofuran, and a reflux period of seven hours. There was thus obtained 5.0 of 4-phenethyl-1H-2,3,4,5-tetrahydro-1,4-benzodiazepine in free base form, M.P. 80.0–83.0° C. (corr.) after two recrystallizations from n-hexane.

EXAMPLE 9

4-allyl-7-chloro-1H-2,3,4,5-tetrahydro-1,4 - benzodiazepine was prepared following the procedure described in Example 7 using 13.1 g. of 4-allyl-7-chloro-3H-1,4-benzodiazepine-2,5(1H,4H)-dione, 4.53 g. of lithium aluminum hydride, 150 ml. of tetrahydrofuran, and a reflux period of seven hours. There was thus obtained 11.6 g. of 4-allyl-7-chloro-1H-2,3,4,5-tetrahydro-1,4-benzodiazepine in free base form which was acylated directly (e.g., see Example 15) without further purification.

EXAMPLE 10

4-allyl-3-methyl-1H-2,3,4,5-tetrahydro-1,4 - benzodiazepine was prepared following the procedure described in Example 7 using 43.4 g. of 4-allyl-3-methyl-3H-1,4-benzodiazepine-2,5(1H,4H)-dione, 21.2 g. of lithium aluminum hydride, 500 ml. of tetrahydrofuran, and a reflux period of seven hours. There was thus obtained 33.6 g. of 4-allyl-3-methyl-1H-2,3,4,5-tetrahydro-1,4-benzodiazepine in free base form, B.P. 90–93° C./0.2 mm.

EXAMPLE 11

4 - allyl-1-propionyl-1H-2,3,4,5-tetrahydro-1,4 - benzodiazepine was prepared as follows: Propionyl chloride (4.6 g) was added to a solution of 9.2 g. of 4-allyl-1H-2,3,4,5-tetrahydro-1,4-benzodiazepine in 50 ml. of chloroform. The solution became very hot and was allowed to stand overnight. The chloroform was distilled off yielding a white crystalline mush which was treated with ether. The resulting white solid was recrystallized twice from ethanol. There was obtained 8.8 g. (62.9%) of 4-allyl-1-propionyl-1H-2,3,4,5-tetrahydro-1,4-benzodiazepine as its hydrochloride, M.P. 237.8–239.2° C. (dec.) (corr.).

EXAMPLE 12

1-acetyl-4-allyl-1H-2,3,4,5-tetrahydro - 1,4 - benzodiazepine was prepared as follows: To a solution of 6 g. of 4-allyl-1H-2,3,4,5-tetrahydro-1,4-benzodiazepine in 50 ml. of chloroform was added a solution of 3.9 g. of acetyl chloride in 5 ml. of chloroform. The reaction mixture became hot and was allowed to stand overnight. The chloroform was distilled off and the remaining white solid was washed with ether and recrystallized twice from ethanol-ether to yield 7.3 g. of 1-acetyl-4-allyl-1H-2,3,4,5-tetrahydro-1,4-benzodiazepine as its hydrochloride, M.P. 230.6–231.4° C. (corr.).

EXAMPLE 13

4-allyl-1-butyryl-1H - 2,3,4,5 - tetrahydro-1,4-benzodiazepine was prepared following the procedure described in Example 12 using 5 g. of 4-allyl-1H-2,3,4,5-tetrahydro-1,4-benzodiazepine and 4.27 g. of butyryl chloride. There was thus obtained 4.9 g. of 4-allyl-1-butyryl-1H-2,3,4,5-tetrahydro-1,4-benzodiazepine in the form of its hydrochloride, M.P. 184.8–186.8° C. (corr.) after two recrystallizations from ethanol-ether.

EXAMPLE 14

4-allyl-1-benzoyl - 1H - 2,3,4,5 - tetrahydro-1,4-benzodiazepine was prepared following the procedure described in Example 12 using 5 g. of 4-allyl-1H-2,3,4,5-tetrahydro-1,4-benzodiazepine and 5.6 g. of benzoyl chloride. There was thus obtained 5.8 g. of 4-allyl-1-benzoyl-1H-2,3,4,5-tetrahydro-1,4-benzodiazepine in the form of its hydrochloride, M.P. 219.4–220.8° C. (dec.) (corr.) after two recrystallizations from ethanol-ether and one from acetonitrile-ether.

EXAMPLE 15

1-acetyl-4-allyl-7-chloro - 1H - 2,3,4,5 - tetrahydro-1,4-benzodiazepine was prepared as follows. To a solution containing 5 g. of 4-allyl-7-chloro-1H-2,3,4,5-tetrahydro-1,4-benzodiazepine in 50 ml. of chloroform was added 1.96 g. of acetyl chloride and the reaction mixture, which became hot, was allowed to stand for one hour. The chloroform was removed by distilling in vacuo and the resulting oil was dissolved in ethanol. The ethanol solution was allowed to stand overnight and the solid that separated was collected and recrystallized to yield 4.0 g. of 1-acetyl-4-allyl-7-chloro-1H-2,3,4,5-tetrahydro-1,4-benzodiazepine as its hydrochloride, M.P. 235.2–235.8° C. (dec.) (corr.).

EXAMPLE 16

4-allyl-3-methyl - 1 - propionyl-1H-2,3,4,5-tetrahydro-1,4-benzodiazepine was prepared following the procedure described in Example 15 using 8.1 g. of 4-allyl-3-methyl-1H-2,3,4,5-tetrahydro-1,4-benzodiazepine and 4.62 g. of propionyl chloride. There was thus obtained 7.7 g. of 4-allyl-3-methyl-1-propionyl - 1H - 2,3,4,5-tetrahydro-1,4-benzodiazepine as its hydrochloride, M.P. 200.2–201.2° C. (corr.) after recrystallization from ethanol-ether.

EXAMPLE 17

1-acetyl-4-phenethyl-1H-2,3,4,5 - tetrahydro-1,4-benzodiazepine was prepared following the procedure described in Example 12 using 8.2 g. of 4-phenethyl-1H-2,3,4,5-tetrahydro-1,4-benzodiazepine and 3.9 g. of acetyl chloride. There was obtained 8.1 g. of 1-acetyl-4-phenethyl-1H-2,3,4,5-tetrahydro-1,4-benzodiazepine in the form of its hydrochloride, M.P. 239.8–240.6° C. (corr.) when recrystallized from isopropyl alcohol.

EXAMPLE 18

1-propionyl-4-phenethyl - 1H - 2,3,4,5 - tetrahydro-1,4-benzodiazepine was prepared following the procedure described in Example 12 using 8.2 g. of 4-phenethyl-1H-2,3,4,5-tetrahydro-1,4-benzodiazepine and 4.6 g. of propionyl chloride. There was thus obtained 7.1 g. of 1-propionyl-4-phenethyl - 1H - 2,3,4,5-tetrahydro-1,4-benzodiazepine as its hydrochloride, M.P. 214.6–216.4° C. (corr.) when recrystallized twice from isopropyl alcohol.

EXAMPLE 19

4-allyl-8-methoxy-1-propionyl - 1H - 2,3,4,5-tetrahydro-1,4-benzodiazepine is formed following the procedure described in Example 11 using corresponding molar equivalent quantities of 4-allyl-8-methoxy-1H-2,3,4,5-tetrahydro-1,4-benzodiazepine and propionyl chloride.

EXAMPLE 20

4-allyl-7-methoxy-1-propionyl - 1H - 2,3,4,5-tetrahydro-1,4-benzodiazepine is formed following the procedure described in Example 11 using corresponding molar equivalent quantities of 4-allyl-7-methoxy-1H-2,3,4,5-tetrahydro-1,4-benzodiazepine and propionyl chloride.

EXAMPLE 21

4-allyl-8-hydroxy-1-propionyl - 1H - 2,3,4,5-tetrahydro-1,4-benzodiazepine is formed following the procedure described in Example 11 using corresponding molar equivalent quantities of 4-allyl-8-hydroxy-1H-2,3,4,5-tetrahydro-1,4-benzodiazepine and propionyl chloride. 4-allyl-8-hydroxy-1H-2,3,4,5-tetrahydro-1,4-benzodiazepine is prepared by demethylation of 4-allyl-8-methoxy-1H-2,3,4,5-tetrahydro-1,4-benzodiazepine by heating it with concentrated hydrobromic acid in glacial acetic acid.

EXAMPLE 22

4-allyl-7-hydroxy-1-propionyl - 1H - 2,3,4,5-tetrahydro-1,4-benzodiazepine is formed following the procedure described in Example 11 using corresponding molar equivalent quantities of 4-allyl-7-hydroxy-1H-2,3,4,5-tetrahydro-1,4-benzodiazepine and propionyl chloride. 4-allyl-7-hydroxy-1H-2,3,4,5-tetrahydro-1,4-benzodiazepine is prepared by demethylation of 4-allyl-7-methoxy-1H-2,3,4,5-tetrahydro-1,4-benzodiazepine by heating it with concentrated hydrobromic acid in glacial acetic acid.

EXAMPLE 23

4 - allyl - 1- ethanesulfonyl-1H-2,3,4,5-tetrahydro-1,4-benzodiazepine is prepared by following the procedure described in Example 11 but using ethanesulfonyl chloride in place of propionyl chloride. Similarly, using methanesulfonyl chloride, n-propanesulfonyl chloride, 2-butanesulfonyl chloride or n-hexanesulfonyl chloride in place of ethanesulfonyl chloride, there is obtained the corresponding 4-allyl-1-alkanesulfonyl-1H - 2,3,4,5 - tetrahydro-1,4-benzodiazepine.

EXAMPLE 24

4 - (cyclopropylmethyl) - 3H - 1,4-benzodiazepin-2,5-(1H,4H)-dione was prepared following the procedure described in Example 2A using 127 g. of iron filings, 800 ml. of ethanol, 35 ml. of acetic acid, 240 ml. of water, and 106.2 g. of ethyl N-(cyclopropylmethyl)-N-(2-nitrobenzoyl)glycinate in 250 ml. of ethanol. There was obtained 69.7 g. (87.5%) of 4-(cyclopropylmethyl)-3H-1,4-benzodiazepin-2,5-(1H,4H)-dione, M.P. 175.0–176.8° C. (corr.).

EXAMPLE 25

4-allyl-8-methoxy-3H-1,4-benzodiazepin-2,5 - (1H,4H)-dione was prepared following the procedure described in Example 2A using 120 g. of iron filings, 800 ml. of ethanol, 35 ml. of acetic acid, 240 ml. of water, and 101.3 g. of ethyl N-allyl-N-(4-methoxy-2-nitrobenzoyl) glycinate in 250 ml. of ethanol. There was obtained 64.5 g. (83.5%) of 4-allyl-8-methoxy-3H-1,4-benzodiozepin-2,5-(1H,4H)dione, M.P. 162.0–164° C. (corr.).

EXAMPLE 26

4 - (cyclopropylmethyl) - 1H - 2,3,4,5-tetrahydro-1,4-benzodiazepine was prepared following the procedure described in Example 7 using 63.3 g. of 4-(cyclopropylmethyl)-3H-1,4-benzodiazepin-2,5-(1H,4H)-dione, 31.2 g. of lithium aluminum hydride, 750 ml. of tetrahydrofuran, and a reflux period of seven hours. There was thus obtained 55 g. of 4-(cyclopropylmethyl)-1H-2,3,4,5-tetrahydro-1,4-benzodiazepine in free base form, 10.6 g. of which was converted into 6.5 g. of its dihydrochloride, M.P. 210.0–215.0° C. (corr.) with decomposition, after recrystallization from ethanol.

EXAMPLE 27

4 - allyl - 8 - methoxy-1H-2,3,4,5-tetrahydro-1,4-benzodiazepine was prepared following the procedure described in Example 7 using 59.1 g. of 4-allyl-8-methoxy-3H-1,4-benzodiazepine-2,5-(1H,4H)-dione, 32.7 g. of lithium aluminum hydride, 750 ml. of tetrahydrofuran, and a reflux period of seven hours. There was obtained 50.5 g. of 4-allyl-8-methoxy-1H-2,3,4,5-tetrahydro - 1,4 - benzodiazepine in free base form, 6.0 g. of which was converted into 5.7 g. of its dihydrochloride, M.P. 182.6–186.0° C. (corr.) after recrystallization from ethanol.

EXAMPLE 28

4-(cyclopropylmethyl)-1-propionyl-1H - 2,3,4,5 - tetrahydro-1,4-benzodiazepine was prepared following the procedure described in Example 11 using 10.1 g. of 4-(cyclopropylmethyl)-1H-2,3,4,5 - tetrahydro - 1,4 - benzodiazepine, 4.62 g. of propionyl chloride and 100 ml. of chloroform. There was thus obtained 10.6 g. of 4-(cyclopropylmethyl)-1-propionyl-1H-2,3,4,5-tetrahydro-1,4 - benzodiazepine as its monohydrochloride, M.P. 226.0–227.0° C. (corr.).

EXAMPLE 29

4-allyl-8-methoxy-1-propionyl-1H-2,3,4,5 - tetrahydro-1,4-benzodiazepine was prepared following the procedure described in Example 11 using 8.8 g. of 4-allyl-8-methoxy-1H-2,3,4,5-tetrahydro-1,4-benzodiazepine, 3.7 g. of propionyl chloride and 100 ml. of chloroform. There was obtained 5.2 g. of 4-allyl-8-methoxy-1-propionyl-1H-2,3,4,5-tetrahydro-1,4-benzodiazepine as its monohydrochloride, M.P. 210.0–212.0° C. (corr.).

EXAMPLE 30

4 - allyl - 7 - benzyloxy-3H-1,4-benzodiazepin-2,5-(1H,4H)-dione was prepared following the procedure described in Example 2A using 110 g. of iron filings, 700 ml. of ethanol, 35 ml. of acetic acid, 200 ml. of water, and 80 g. of ethyl N-allyl-N-(5-benzyloxy-2-nitrobenzoyl) glycinate in 150 ml. of ethanol. There was obtained 48.9 g. of 4 - allyl - 7 - benzyloxy-3H-1,4-benzodiazepin-2,5-(1H,4H)-dione, M.P. 187–191° C.

The above intermediate ethyl N-allyl-N-(5-benzyloxy-2-nitrobenzoyl)glycinate was prepared as follows: A solution of 43.3 g. of dicyclohexylcarbodiimide in 300 ml. of tetrahydrofuran was added to a solution of 55.0 g. of 5 -benzyloxy - 2 - nitrobenzoic acid and 30.0 g. of ethyl N-allylglycinate in 700 ml. of tetrahydrofuran, and allowed to stand for twenty hours. The precipitate of dicyclohexyl urea was filtered off and washed well with tetrahydrofuran. The filtrate and washings were combined and concentrated in vacuo to yield 90 g. of oily product, ethyl N-allyl-N-(5-benzyloxy - 2 - nitrobenzoyl) glycinate, which was used directly as shown above without further purification.

EXAMPLE 31

4 - allyl - 7-benzyloxy-1H-2,3,4,5-tetrahydro-1,4-benzodiazepine was prepared following the procedure described in Example 7 using 48.0 g. of 4-allyl-7-benzyloxy-3H-1,4-benzodiazepin-2,5-(1H,4H)-dione, 17 g. of lithium aluminum chloride, 500 ml. of tetrahydrofuran, and a reflux period of twenty-one hours. The work-up was as follows: The reaction mixture was filtered and the precipitate washed well with tetrahydrofuran. The filtrate and washings were concentrated to an orange oil which began to crystallize. The oil was dissolved in 50 ml. of ether, chilled and scratched. The product was collected, washed with a little cold ether, then n-pentane. Recrystallization from n-hexane gave 19.9 g. product, 4-allyl-7-benzyloxy - 1H - 2,3,4,5 - tetrahydro-1,4-benzodiazepine, M.P. 77–79.2° C. (corr.). The filtrate from the ether crystallization was treated with an ethereal hydrogen chloride solution which precipitated an orange gum. The gum was covered with acetone and allowed to stand overnight. The resulting white solid was dissolved in water and basified with 35% sodium hydroxide solution. The precipitated oil crystallized after washing with water and scratching. Recrystallization from n-hexane gave a further 8.7 g. of 4-allyl-7-benzyloxy-1H-2,3,4,5-tetrahydro-1,4-benzodiazepine, 77–79° C.

EXAMPLE 32

4 - allyl - 7 - hydroxy-1H,2,3,4,5-tetrahydro-1,4-benzodiazepine was prepared from the corresponding 7-benzyloxy compound of Example 31 as follows: Concentrated hydrochloric acid (45 ml.) was added to 13.1 g. of 4 - allyl - 7 - benzyloxy-1H-2,3,4,5-tetrahydro-1,4-benzodiazepine and the resulting solution was immediately cooled in ice. After one hour, the solution was allowed to stand at room temperature for twenty-four hours. The solution was diluted with 50 ml. of water and extracted three times with ether to remove benzyl chloride. The aqueous solution was evaporated in vacuo to a gum which was dissolved in 25 ml. of water and basified with 10% sodium carbonate solution. Four extractions with methylene chloride and evaporation of the extracts gave 7.5 g. (82.5%) of an oil which crystallized after several days. The solid was triturated with a small amount of ethyl acetate to yield, as a pink solid, the product, 4-allyl-7 - hydroxy - 1H - 2,3,4,5-tetrahydro-1,4-benzodiazepine, M.P. 97–111° C.

EXAMPLE 33

4-allyl-7-hydroxy-1-propionyl-1H - 2,3,4,5 - tetrahydro-1,4-benzodiazepine.—A mixture of 8.5 g. of 4-allyl-7-hydroxy-1H-2,3,4,5-tetrahydro-1,4-benzodiazepine, 20 ml. of propionic anhydride and one drop of concentrated sulfuric acid was heated on the steam bath until a clear solution resulted. This was allowed to stand overnight. Methanol (25 ml.) was added and the solution allowed to stand for five hours. Evaporation in vacuo gave the oily N,O-dipropionyl derivative. The oil was heated in an open beaker for two hours on the steam bath with 5 ml. of 35% sodium hydroxide, 20 ml. of water and enough ethanol to give a clear solution. The solution was carefully neutralized by dropwise addition of acetic acid and extracted three times with ethyl acetate. Evaporation of the solvent gave a dark oil which was dissolved in 200 ml. of ether. A small amount of amorphous brown solid was removed by filtration. Ethereal hydrogen chloride was added to the filtrate and the resulting slightly gummy solid collected. The solid was recrystallized twice from absolute methanol to yield 5.4 g. (43.5%) of product, 4-allyl-7-hydroxy-1-propionyl-1H-2,3,4,5-tetrahydro - 1,4 - benzodiazepine, M.P. 245.0–246.0° C. (corr.).

Compounds of Formula I which were prepared as described in the foregoing examples were found to be antagonists of strong analgesics. Thus, when tested in rats by a modified D'Armour-Smith test procedure, they were found to be antagonists of the analgesic activity of meperidine. In this test procedure, when the compounds of this invention were administered prior to or simultaneously with administration of meperidine, the expected analgesic effect of the latter was decreased with increasing dosage levels of the former to a point where no analgesic effect was obtained. And when the new compounds were administered after the administration of meperidine, the analgesic effect was diminished or terminated, depending on the dosage levels involved. For example, representative compounds of this invention, each in the form of an aqueous solution of the hydrochloric acid acid-addition salt, were administered subcutaneously to rats to determine the dosage level, in terms of weight of antagonist per kilogram of body weight of the animal, which caused reduction of the analgesic effect of a 60 mg./kg. dose of meperidine hydrochloride by approximately 50 percent ($AD_{50}$). The results thus obtained for the hydrochloric acid acid-addition salt of each of the following illustrative compounds were as follows:

Meperidine antagonism

| Products of Example No.: | $AD_{50}$, mg./kg. |
|---|---|
| 11[1] | 24 |
| 12[1] | 95 |
| 13[1] | 70 |
| 14[1] | 130 |
| 15[1] | 48 |
| 16[1] | 22 |
| 17[1] | 58 |
| 18[1] | 24 |
| 26[2] | 100 |
| 27[2] | 34 |
| 28[1] | 35 |
| 29[1] | 21 |
| 31[1] | 20 |
| 33[1] | 80 |

[1] Product in the form of its monohydrochloride.
[2] Product in the form of its dihydrochloride.

The above compounds when tested alone in rats by the above-noted D'Armour-Smith test procedure were found to have no analgesic activity at a dose level of 120 mg./kg.

My above-noted 4[(lower-cycloalkyl)-(lower-alkyl)]-3H-1,4-benzodiazepine-2,5(1H,4H)-diones when administered orally to mice using a modified procedure of the photocell activity cage method [Harris and Uhle, J. Pharmacol. 132, 251 (1961)] were found to have psychomotor depressant properties at dose levels of about 100 to 300 mg./kg. of body weight, e.g., 4-cyclopropylmethyl)-3H-1,4-benzodiazepine-2,5(1H,4H)-dione.

I claim:
1. A compound of the formula

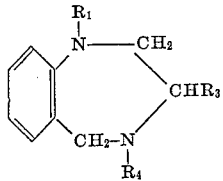

where $R_1$ is lower alkanoyl, lower-alkane-sulfonyl or benzoyl, $R_3$ is hydrogen or lower-alkyl, and $R_4$ is lower-alkenyl, halo - (lower - alkenyl), phenyl - (lower - alkyl), (lower-cycloalkyl)-(lower-alkyl) or lower - carbalkoxy-(lower-alkyl).

2. A compound according to claim 1 where $R_1$ is lower-alkanoyl, $R_3$ is hydrogen and $R_4$ is allyl.

3. 4-allyl-1H-2,3,4,5-tetrahydro-1,4-benzodiazepine according to claim 14 where $R_1$ and $R_3$ are each hydrogen and $R_4$ is allyl.

4. 4-allyl-1-propionyl-1H - 2,3,4,5 - tetrahydro-1,4-benzodiazepine according to claim 1 where $R_1$ is propionyl, $R_3$ is hydrogen and $R_4$ is allyl.

5. 1-acetyl-4-allyl-7-chloro-1H-2,3,4,5-tetrahydro - 1,4-benzodiazepine according to claim 1 where $R_1$ is acetyl, $R_3$ is hydrogen, $R_4$ is allyl and the benzenoid ring is substituted by chloro at the 7-position.

6. 4-allyl-3-methyl-1-propionyl-1H-2,3,4,5 - tetrahydro-1,4-benzodiazepine according to claim 1 where $R_1$ is propionyl, $R_3$ is methyl and $R_4$ is allyl.

7. 1-propionyl-4-phenethyl-1H-2,3,4,5-tetrahydro - 1,4-benzodiazepine according to claim 1 where $R_1$ is propionyl, $R_3$ is hydrogen and $R_4$ is phenethyl.

8. 4 - (cyclopropylmethyl)-1H-2,3,4,5-tetrahydro - 1,4-benzodiazepine.

9. 4-allyl-8-methoxy-1H-2,3,4,5-tetrahydro - 1,4 - benzodiazepine according to claim 14 where $R_1$ and $R_3$ are each hydrogen, $R_4$ is allyl and the benzenoid ring is substituted by methoxy at the 8-position.

10. 4-allyl-7-benzyloxy-1H-2,3,4,5-tetrahydro - 1,4-benzodiazepine according to claim 14 where $R_1$ and $R_3$ are each hydrogen, $R_4$ is allyl and the benzenoid ring is substituted by benzyloxy at the 7-position.

11. 4 - (cyclopropylmethyl)-1-propionyl - 1H-2,3,4,5-tetrahydro-1,4-benzodiazepine according to claim 1 where $R_1$ is propionyl, $R_3$ is hydrogen and $R_4$ is cyclopropylmethyl.

12. 4-allyl-8-methoxy-1-propionyl - 1H - 2,3,4,5 - tetrahydro-1,4-benzodiazepine according to claim 1 where $R_1$ is propionyl, $R_3$ is hydrogen, $R_4$ is allyl and the benzenoid ring is substituted by methoxy at the 8-position.

13. 4-allyl-7-hydroxy-1-propionyl - 1H - 2,3,4,5-tetrahydro-1,4-benzodiazepine according to claim 1 where $R_1$ is propionyl, $R_3$ is hydrogen $R_4$ is allyl and the benzenoid ring is substituted by hydroxy at the 7-position.

14. A compound of the formula

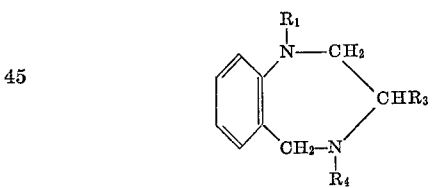

where $R_1$ is hydrogen, lower-alkanoyl, lower-alkanesulfonyl or benzoyl, $R_3$ is hydrogen or lower-alkyl, and $R_4$ is lower-alkenyl, halo-(lower-alkenyl) or lower-carbalkoxy-(lower-alkyl).

References Cited

UNITED STATES PATENTS 3,244,698    4/1966    Uskokovic et al. _____ 260—239

ALTON D. ROLLINS, *Primary Examiner.*

UNITED STATES PATENT OFFICE
CERTIFICATE OF CORRECTION

Patent No. 3,384,635                            May 21, 1968

Philip M. Carabateas

It is certified that error appears in the above identified patent and that said Letters Patent are hereby corrected as shown below:

Column 1, line 61, cancel "lower-alkyl,", second occurrence. Column 6, line 13, "182.2° C." should read -- 186.2° C. --; same column 6, in the table, fourth column, line 3 thereof, "CN$_2$-cyclopropyl" should read -- CH$_2$-cyclopropyl --.

Signed and sealed this 13th day of January 1970.

(SEAL)
Attest:

Edward M. Fletcher, Jr.                    WILLIAM E. SCHUYLER, JR.
Attesting Officer                              Commissioner of Patents